United States Patent
Rückert

Patent Number: 5,828,047
Date of Patent: Oct. 27, 1998

[54] CYCLE MEASUREMENT DEVICE AND METHOD FOR MAKING THE SAME

[75] Inventor: Jochen Rückert, Seebach, Germany

[73] Assignee: Ruhlatec Industrieprodukte GmbH, Seebach, Germany

[21] Appl. No.: 804,633

[22] Filed: Feb. 25, 1997

[30] Foreign Application Priority Data

Dec. 6, 1996 [DE] Germany ......................... 196 50 690.5

[51] Int. Cl.⁶ .................................................... B41J 2/00

[52] U.S. Cl. ........................................... 235/462; 235/464

[58] Field of Search .................................. 235/462, 463, 235/464

[56] References Cited

U.S. PATENT DOCUMENTS 5,395,181  3/1995  Dezse et al. ............................ 235/432

*Primary Examiner*—Don Wong
*Attorney, Agent, or Firm*—Collard & Roe, P.C.

[57] ABSTRACT

A cycle measuring device and method for making the same utilizing a cover or protective layer, continuous outer peripheral bar codes and inner annular bar codes around the mounting apertures of the measuring device. The cover or protective layer covers the entire surface of the reflective layer of the measuring device including the measuring bar codes, the transparent windows between the measuring codes, and the continuous bar codes formed on the outer peripheral edges of the device and outer edges of the inner mounting apertures.

9 Claims, 3 Drawing Sheets

CYCLE MEASUREMENT DEVICE AND METHOD FOR MAKING THE SAME

BACKGROUND OF THE INVENTION

1. Field of the Invention

The present invention relates to cycle measuring devices. More particularly, it relates to a cycle ruler/disc having a transparent carrier with a light sensitive film layer and a plurality of bar codes and transparent window openings for scanning by optical sensors.

2. The Prior Art

Cycle rulers and cycle discs serve to record the position of operating machines, manipulators or other setting devices. They generally consist of a transparent material containing codes which are scanned by optical sensors.

Generally, cycle discs are fixed on a rotating axle by means of a hub. By applying a light transmission method, a ray of light generates pulses while the disc is rotating. the light source is positioned parallel to the axis of rotation and projects a ray of light perpendicular to the disc.

It is advisable for the transparent material, on the side facing away from the light transmitter, to be provided with a reflective material. The reflective material reflects the light rays emitted from the transmitter in the optical axis such that they can be recorded by a receiver. The length and frequency of the pulses is determined by so-called window openings which are predetermined when arranging the bar codes on the cycle measuring device. The bar codes code the cycle measuring device into "transparent and lightproof regions". The (bar) codings for the cycle rulers have to be produced with a high degree of accuracy to ensure that the positions of the moved machine parts are accurately determined.

For producing cycle rulers or cycle discs, it is advantageous to use industrial film which is exposed to light by using masks or a photoplotter. The development of this film results in blacked codings, or "bar codes". At the "window openings", the exposed and developed standard film is transparent and the codings consist of black and non-reflective silver grains which are embedded in gelatine.

After the film has been exposed, developed and rinsed, the code marks are arranged in the form of raised portions on the carrier layer at predetermined distances. After careful examination, it has been found that between the raised portions, there remains a residue of gelatine which, in spite of careful development processes and multiple rinsings, cannot be fully removed.

A reflective layer is applied to the surface by stemming, or other thin film methods. However, since the reflective layer is not humidity-proof, it is necessary to apply a water vapor blocking layer in order to improve the corrosion behavior.

For production-technical reasons, cycle rulers and cycle discs are produced on large-surface carrier materials and divided into individual parts by punching or cutting. At the resulting cutting edges, the individual layers are unprotected and exposed to the environment. The humidity penetrating into the layer of gelatine blows up the composite and deforms the reflective layer and thereby adversely effecting the measuring accuracy.

SUMMARY OF THE INVENTION

The present invention provides a cycle measuring device and method for making the same that overcomes the shortfalls of the prior art.

According to the invention, a continuous bar code is disposed along the entire peripheral edge of the cycle measuring device and the reflective layer is provided with a cover. The cover covers the coding, transparent windows and continuous bar code up to the peripheral edge of the cycle measuring device.

It is therefore an object of the present invention to provide a cycle measuring device and method for making the same that can provide accurate readings over extended periods of use.

It is a further object of the invention to provide a cycle measuring device and method for making the same that is less susceptible deformation caused by humidity It is another object of the invention to provide a cycle measuring device and method for making the same that operates efficiently and reliably.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
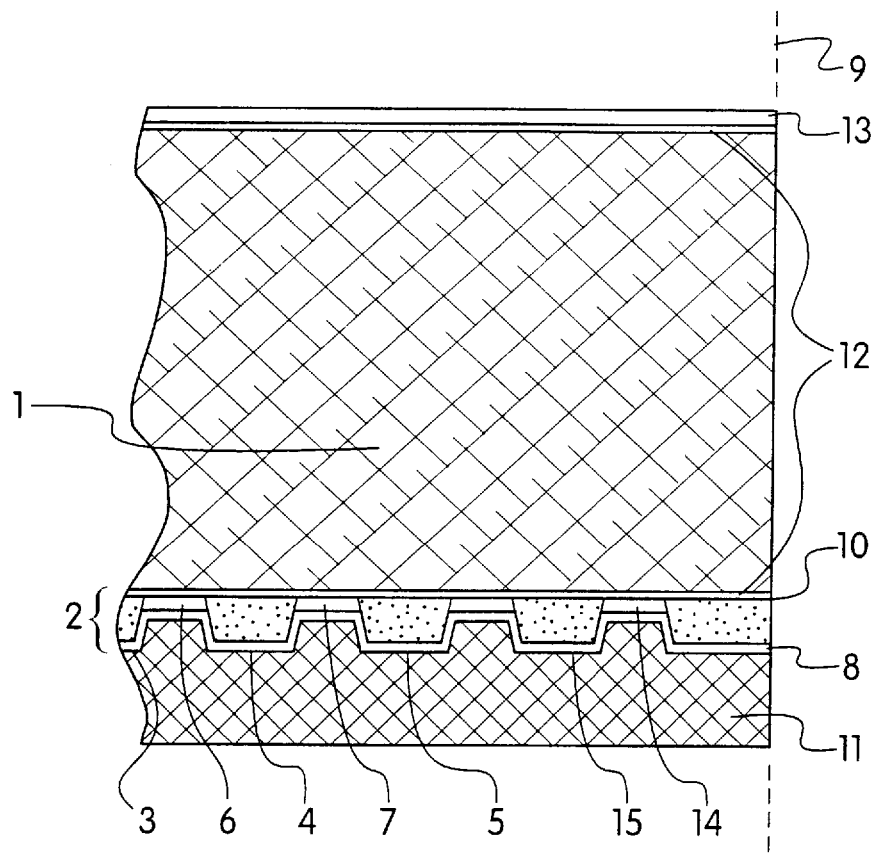
FIG. 1 is cross-sectional view of a cycle ruler according to the invention.

Turning now in detail to the drawings, FIG. 1 shows a cross-section of a cycle ruler having a carrier 1 of a transparent material, such as, for example, polyester material, which is connected to an upper and lower gelatine layer 13 and 14, respectively, by means of an adhesive layer.

On the side which, according to the view shown in FIG. 1, is the lower side, the region of the gelatine layer 14 is provided with bar codes 3, 4, 5, 10 and 15 which, after exposure of the light-sensitive layer 2, have been produced by blackening the silver grains in the gelatine layer.

After the exposed, silver-grain-containing gelatine layer has been rinsed, there remains residual gelatine 14 between the code marks 3, 4, 5, 10, 15. These regions are covered by a reflective layer 8 through a thin film process. A protective layer 11 is applied after reflective layer 8 and serves to cover the reflective layer, the transparent openings 6, 7, 15, etc., and the continuous bar code 15. Protective layer 11 can be varnish or any other suitable known material.

Figure 2B:
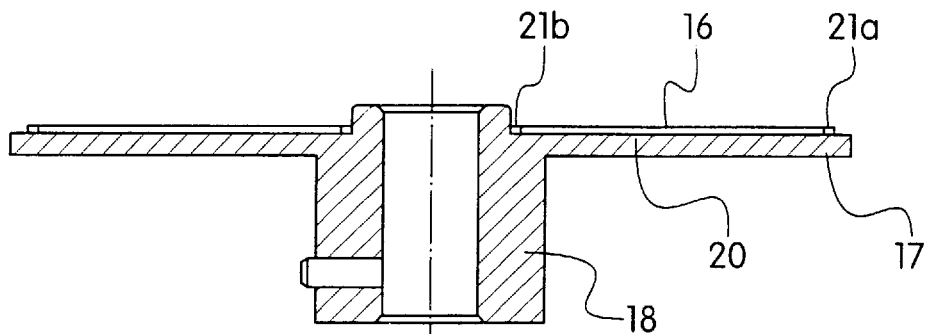
FIG. 2b is a cross-sectional view of the cycle disc of FIG. 2a taken along line II—II.
Figure 2A:
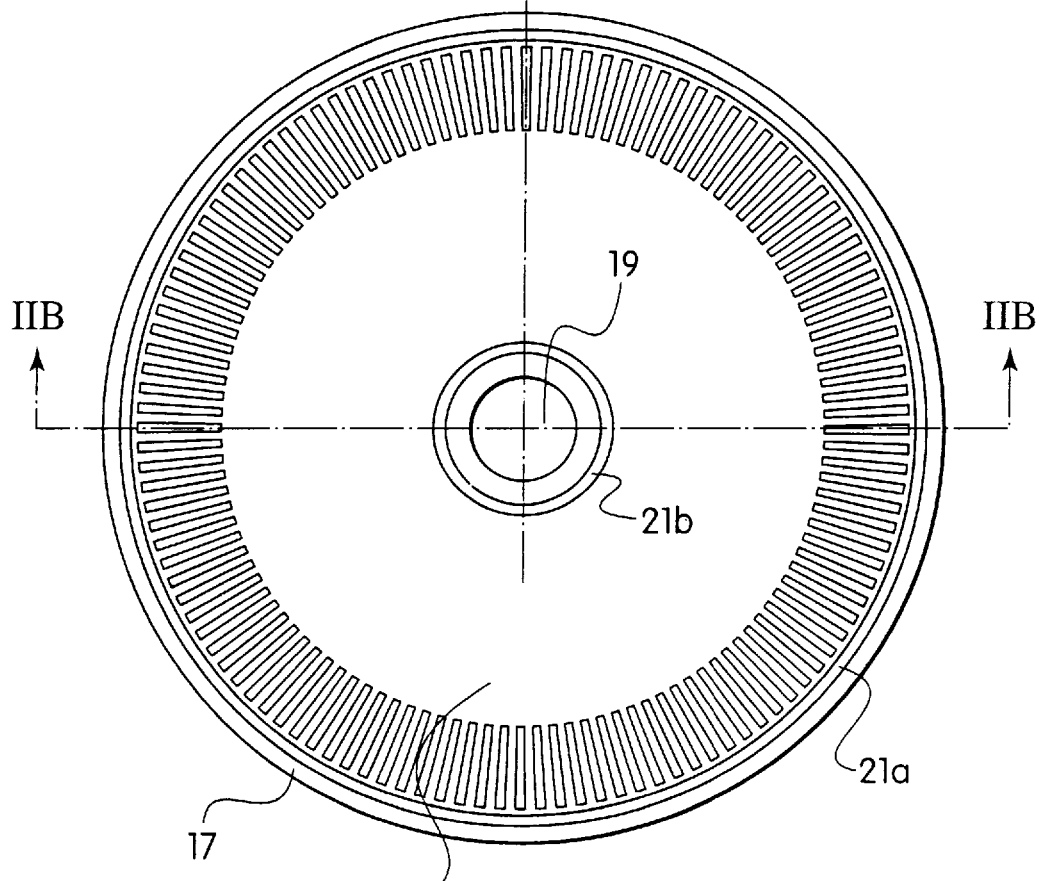
FIG. 2a is a plan view of a cycle disc according to the invention.

FIGS. 2a and 2b show an embodiment of the invention in the form of a cycle disc 16. The mount comprises a flange face 17 and a centric hub 18 on which cycle disc 17 is centered by means of its central opening 19. Instead of protective layer 11, the flange face 17 is connected to the reflective layer 8 by an adhesive layer 20. Flange face 17 is a firm carrier that replaces the use of protective layer 11, and serves as the cover for reflective layer 8.

The outer peripheral rim of the cycle disc is provided with an annular or bead-shaped bar codes 21a, which is blackened throughout and forms the end edges of the cycle disc. The inner peripheral edge of opening 19 also includes an annular or bead shaped bar code 21b that forms the inner edge of the cycle disc.

Figure 3B:
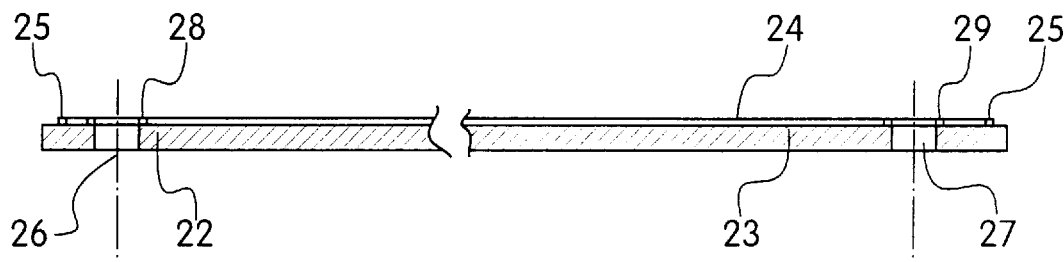
FIG. 3b is a cross sectional view of the cycle ruler of FIG. 3a taken along line III—III.
Figure 3A:
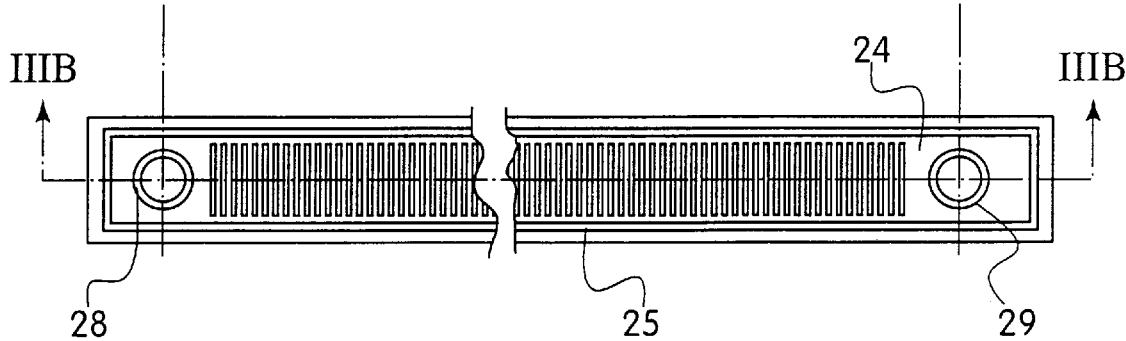
FIG. 3a is a plan view of a cycle ruler according to the invention.

FIGS. 3a and 3b show a reflective cycle ruler 30 utilizing a rectangular carrier 22 which is connected to the reflective cycle ruler by means of an adhesive layer 23. Rectangular carrier 22 serves as the cover for the reflective layer in ruler 24. The edge of cycle ruler 24 is formed by a continuous rectangular code bar 25 in the outer region, and annular or bead-shaped edges 28 and 29 around fixing bores 26 and 27, respectively.

While two embodiments of the present invention have been shown and described, it is to be understood that many changes and modifications may be made thereunto without departing from the spirit and scope of the invention as defined in the appended claims.

What is claimed is:

1. A cycle measurement device comprising:

a transparent carrier (1) having an upper surface, a lower surface, and an edge region (9);

a light sensitive film layer (2) coupled to said lower surface of said carrier, said film layer (2) comprising a plurality of spaced bar codes blackened by light exposure, and transparent window openings (6, 7) arranged between said bar codes such that said bar codes and window openings can be scanned by optical sensors;

a continuous bar code disposed along said edge region (9); and a reflective layer (8) including a cover for covering said plurality of bar codes, said window openings, and said continuous bar code, said cover extending to said edge region (9).

2. The cycle measurement device according to claim 1, wherein said cover comprises a protective layer (11) adhered to said reflective layer.

3. The cycle measurement device according to claim 1, wherein said cover comprises varnish.

4. The cycle measurement device according to claim 1, wherein said cover comprises a firm carrier material and whereby the spaces between said bar codes, said window openings and said edge region are filled with an adhesion promotor.

5. The cycle measurement device according to claim 1, wherein said plurality of bar codes (3, 4, 5, and 15) are arranged in the form of raised portions on the cycle measurement device and that said continuous bar code (10, 21a, 25) forms the outer edge of the cycle measurement device.

6. The cycle measurement device according to claim 1, wherein said transparent carrier includes mounting apertures having outer edges, and wherein a continuous bar code (21b, 28, 29) forms the outer edges of the mounting apertures.

7. A method of producing a cycle measurement device comprising the steps of:

masking a film carrier with a plurality of measuring bar codes and peripheral edge bar codes;

exposing the film carrier to light;

developing the film to produce the plurality of measuring bar codes and continuous peripheral edge bar code;

rinsing the developed film carrier to remove the gelatine layer between the bar codes;

applying a reflective layer and cover to the film carrier covering the measuring bar codes, the transparent windows between the codes and the continuous peripheral edge bar code; and separating the cycle measurement device along the continuous peripheral edge bar code.

8. The method according to claim 7, wherein said step of applying the reflective layer and cover includes the step of applying an adhesion promotor to the entire surface of the reflective layer for receiving the cover.

9. The method according to claim 7, further comprising the step of punching a centrally disposed opening into the carrier for being fixed on a hub, wherein the cutting edge of the opening is arranged on an annular bar code extending coaxially with respect to the hub aperture.

* * * * *